United States Patent [19]

Dauvin

[11] Patent Number: 5,310,008
[45] Date of Patent: May 10, 1994

[54] PICKER GRATE FOR A ROCK PICKER

[76] Inventor: George A. Dauvin, Box 134, Redvers, Saskatchewan, Canada, S0C 2H0

[21] Appl. No.: 952,987

[22] Filed: Sep. 29, 1992

[51] Int. Cl.⁵ .................. A01B 43/00; A01B 39/19
[52] U.S. Cl. ...................................... 171/64; 172/44; 171/18; 171/63
[58] Field of Search .............. 171/63, 4, 9, 13, 18, 171/50, 64, 65, 83, 84, 107, 111, 114, 116, 121, 124; 172/44

[56] References Cited

U.S. PATENT DOCUMENTS

| | | | |
|---|---|---|---|
| 2,385,895 | 10/1945 | Tramontini | 172/44 |
| 2,718,110 | 9/1955 | Butler | 171/18 |
| 2,747,354 | 5/1956 | Bloser | 172/44 |
| 3,661,101 | 5/1972 | Parsons | 172/44 |
| 3,690,383 | 9/1972 | Malley et al. | 172/44 |
| 4,159,745 | 7/1979 | Hood et al. | 172/44 |
| 4,232,745 | 11/1980 | Vivamontes | 172/44 |
| 4,913,241 | 4/1990 | Haukaas | 172/44 |
| 5,141,058 | 8/1992 | Heppner | 171/63 |

Primary Examiner—Randolph A. Reese
Assistant Examiner—Spencer Warnick
Attorney, Agent, or Firm—Adrian D. Battison; Stanley G. Ade; Murray E. Thrift

[57] ABSTRACT

A rock picker includes a picker grate having a plurality of picker bars extending in a curved path forwardly and downwardly to a forwardmost end for engaging the rocks and lifting them onto the picker grate. A conventional sweeping reel sweeps the rocks to a hopper. The forward end of each of the grate bars includes a portion consisting of a vertical plate parallel to the direction of movement together with a rotating rod which extends across the full width of the picker and is supported by the cup-shaped forward ends of the grate bars. The rod improves the rock picking action and also allows the clearing of trash between the rod and the vertical plate portions exposed at the front of the grate bars. A second embodiment includes a further roe positioned with a trip mechanism forwardly and downwardly of the first rod.

16 Claims, 3 Drawing Sheets

PICKER GRATE FOR A ROCK PICKER

This invention relates to an improvement in a rock pickers and particularly the provision of an improved picker grate which is arranged to engage and lift rocks from the ground for transportation on the picker grate upwardly and rearwardly for collection.

Rock pickers are manufactured by many different companies in various different designs. However in recent years in most cases the design has included a picker grate including a plurality of individual grate bars which are arranged to slide across the ground in contact with or just under the ground. The grate bars are arranged parallel to the direction of movement of the rock picker on ground wheels supporting the main frame of the rock picker. The grate bars are spaced apart transversely of the direction of movement so as to allow soil to drop between the grate bars while the rocks slide upwardly or are carried upwardly over the grate bars to the collection hopper. The movement of the rocks over the grate bars is effected by a rotating reel assembly which includes a plurality of sweep bars mounted on the reel at spaced positions around an axis of rotation of the reel. Each bar extends across the grate and includes a plurality of fingers which extend from the sweep bar generally outwardly so as to extend between each grate and the next adjacent grate bar to sweep the area therebetween to carry the rocks rearwardly and upwardly of the grate bars.

The actual lifting action of the rocks from the soil is effected simply by the transverse ends of the grate bars. These can only lift a rock if the force is on the rock from the engagement with the grate bars and the soil are sufficient to lift the rock onto the top of the grate bars for sweeping to the container. In many cases however the rock is punched downwardly by the engagement with the grate bar rather than lifted upwardly. The picking action is therefore somewhat ineffecient.

It is one object of the present invention, therefore, to provide an improved picker grate for a rock picker.

According to the invention, therefore, there is provided an agricultural rock picker comprising a frame, ground wheels on the frame for moving the frame across the ground in a direction of working moving, a picker grate mounted on the frame for movement across the ground for lifting rocks from the ground onto the grate for collection, the picker grate comprising a plurality of grate bars arranged in parallel relationship parallel to the direction of movement and spaced apart transversely to the direction of movement, each grate bar having a forward end and extending rearwardly and upwardly therefrom for transporting rocks lifted over the forward end rearwardly for collection, a rod mounted transversely to the grate bars at the forward ends thereof so as to engage the ground and any rocks therein immediately forwardly of the forward ends of the grate bars and means for drivingly rotating the rod in a direction such that a forward part of the surface of the rod moves upwardly.

Embodiments of the invention will now be described in conjunction with the accompanying drawings in which.

DETAILED DESCRIPTION

Figure 1:
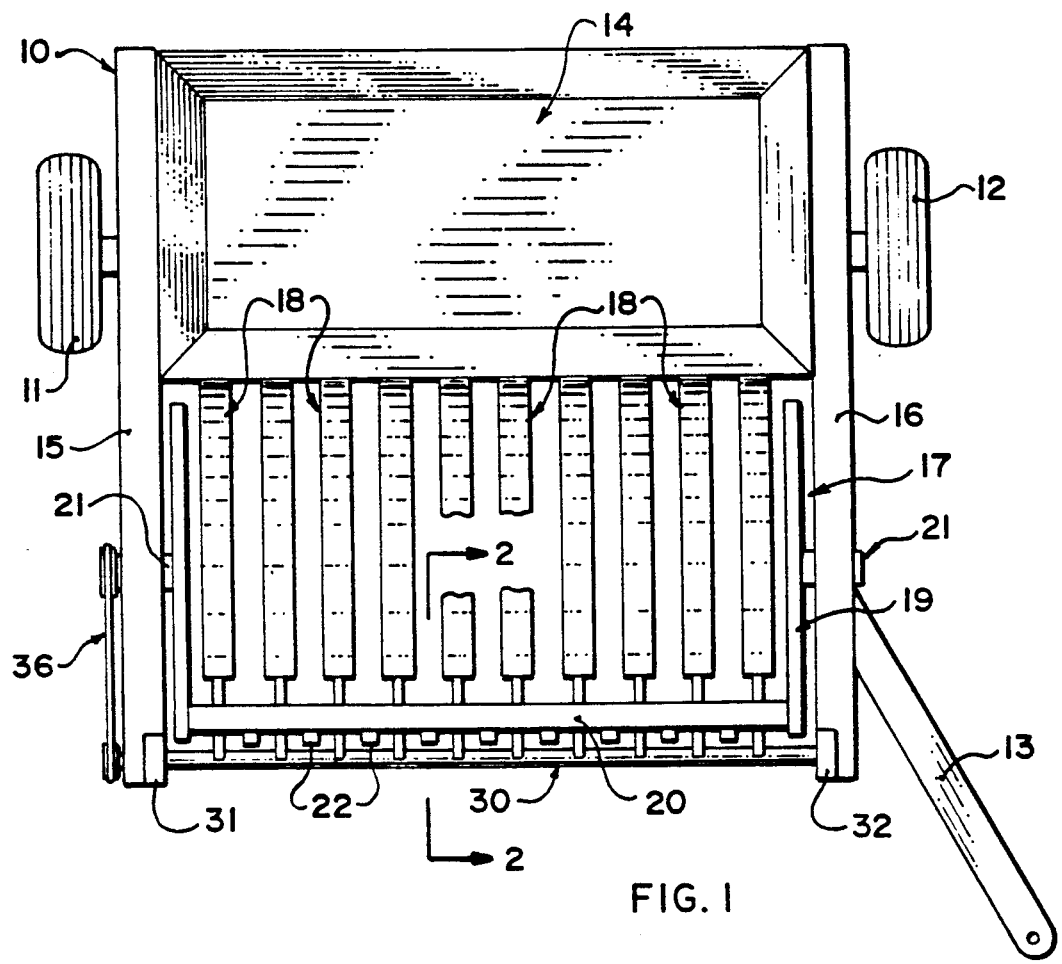
FIG. 1 is a top plan view of a first embodiment of rock picker according to the present invention.

A rock picker as shown in FIG. 1 includes a frame 10 on which is mounted ground wheels 11 and 12 for transportation of the frame across ground from which the rocks are to be picked. The frame is attached to a hitch 13 by which the rock picker can be towed behind a suitable tractor vehicle. On the frame is mounted a hopper 14 for receiving the rocks which have been picked for transportation to a suitable discharge site. At the front of the rock picker between two frame elements 15 and 16 is provided a picker grate generally indicated at 17 which acts to lift the rocks from the ground and to transport those rocks rearwardly to the hopper 14. The picker grate includes a plurality of grate bars 18 which curve upwardly and rearwardly from a from end at or adjacent the ground to a rear end at the hopper 14. Rocks are swept over the grate bars to the hopper by a reel rock sweeper assembly 19 including a plurality of sweeper bars 20 (only one of which is shown for clarity). The rock sweeper assembly generally comprises a reel rotatable about a single horizontal axis and including a plurality of sweeper bars at spaced positions around the axis of rotation. However other techniques for mounting the sweeper bars can be used including conveyor belts systems for example of the type shown in U.S. Pat. No. 5,141,058 (Heppner). In the example shown, the reel 19 is mounted upon an axle. The reel 19 is mounted upon an axle 21 carried on the frame so that it defines the axis of the reel as a horizontal transverse axis. Each of the sweeper bars 20 lies parallel to the axis so as to sweep over the upper surface of the grate bars and includes a plurality of outwardly extending sweeper teeth 22. The teeth extend outwardly so as to pass between respective pairs of grate bars with a number of teeth being equal to the number of spaces between the grate bars. The rotation of the reel is arranged such that the sweeper bars move in a path along the upper surface of the grate bars with the sweeper teeth extending therefrom through the grate bars to carry the rocks upwardly into the hopper.

The above elements so far described are entirely conventional in a rock picker. These elements are shown only schematically as it will be well apparent to one skilled in the art that there is different designs and constructions that can be employed for these elements in accordance with the many different designs of product available currently on the marketplace.

The present invention relates to the forward end of the picker grate and can be designed or modified to be mounted on any particular arrangement of rock picker of the type generally described above.

Each grate bar comprises a transverse plate portion 25 and a vertical plate portion 26 which are arranged to form a T-shape cross section along the majority of the length of the grate bar. The transverse plate 25 however terminates at an end 27 spaced rearwardly from a forwardmost end 28 of the vertical plate 26. This construction therefore provides a narrower space between the grate bars in the area extending from the front edge 27 rearwardly to the hopper than in the area simply between the exposed portions of the vertical plate 26.

The forward ends 28 of the vertical plates are aligned transversely of the picker grate and each includes an arcuate recess 29 for cupping a transverse rod 30. The rod is carried on a pair of vertically depending legs 31 and 32 connected to the respective frame portions 15 and 16. At the base of each of the legs 31 and 32 is provided a bearing 33 for supporting the rod for rotation about a longitudinal axis of the rod. In addition one of the legs 31 and 32 includes a drive sprocket 34 cooperating with a chain 35 extending longitudinally of the leg 32. The chain 35 is driven by a sprocket at an upper end of the leg with that sprocket being driven either by a hydraulic motor mounted on the leg or by a chain drive mechanism generally indicated at 36 receiving drive from a suitable location on the rock picker for example the shaft 21. The rod is driven in the direction of the arrow 37 so the front face of the rod moves upwardly. The legs 31 and 32 are shaped so that they can engage into the ground while protecting the bearings 33 and the sprocket 34. Thus the rod itself can run across the ground at a position just underneath the surface of the ground as indicated at 38 with the transverse plate 25 commencing at a position just above the ground.

The rod is thus supported across the picker grate at the forwardmost point thereon for acting as the ground engaging mechanism of the picker grate. The rod thus acts to impact upon rocks just under the surface of the ground or at the surface of the ground and the rotation of the rod tends to lift those rocks upwardly rather than to punch them downwardly into the ground. The rocks are lifted over the rod into the area just behind the rod which is defined by the portions of the vertical plate which are exposed in front of the transverse plate 25.

In addition to the action upon the rocks, this unique arrangement of the vertical plates of the grate bars in conjunction with the rod causes the straw and other trash remaining on the ground surface to pass through the wider area between the grate bars rather than becoming collected on top of the transverse plates of the grate bars. In a suprising and unexpected manner, the rotation of the rod in conjunction with this wider area ensures that the trash is cleaned from the rock picker without collection into a layer on the picker grate. In current techniques of farming there are in many cases significantly more quanties of trash so that this particular technique of releasing the trash is of major importance.

Figure 2:
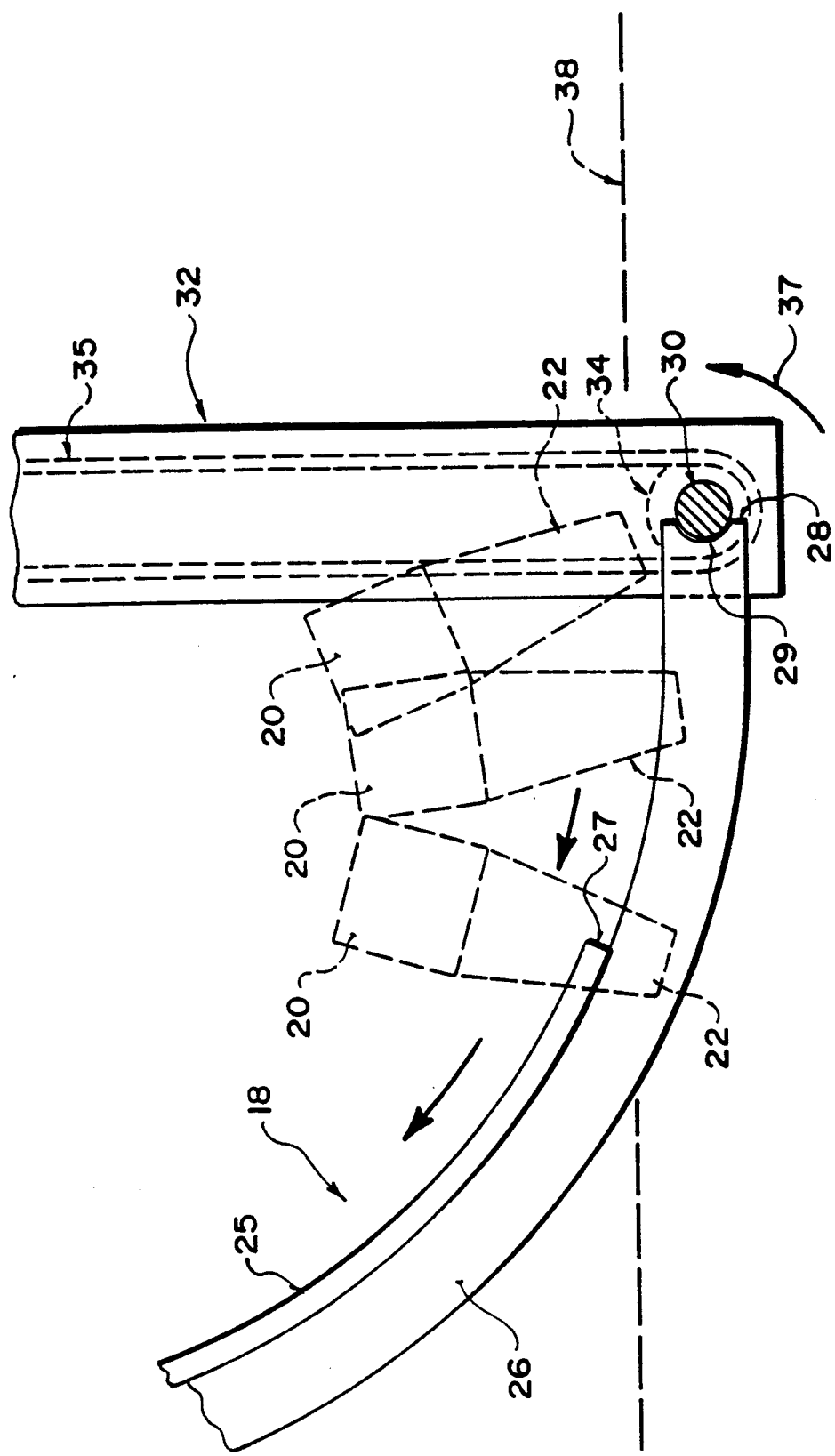
FIG. 2 is a cross sectional view along lines 2—2 of FIG. 1.

The sweeper teeth 22 are arranged relative to the sweeper bar 20 so that the sweeper teeth pass just over the rod as shown in FIG. 2 and then immediately pass into the area between the grate bars.

The cup-shape 29 at the forward end of the grate bars acts to support the rod 30 against movement in a rearward direction. The forward ends of the grate bars therefore act to support the rod should the rod be bent rearwardly from its normal position supported by the legs in response to vigorous engagement with a particularly heavy rock.

Figure 3:
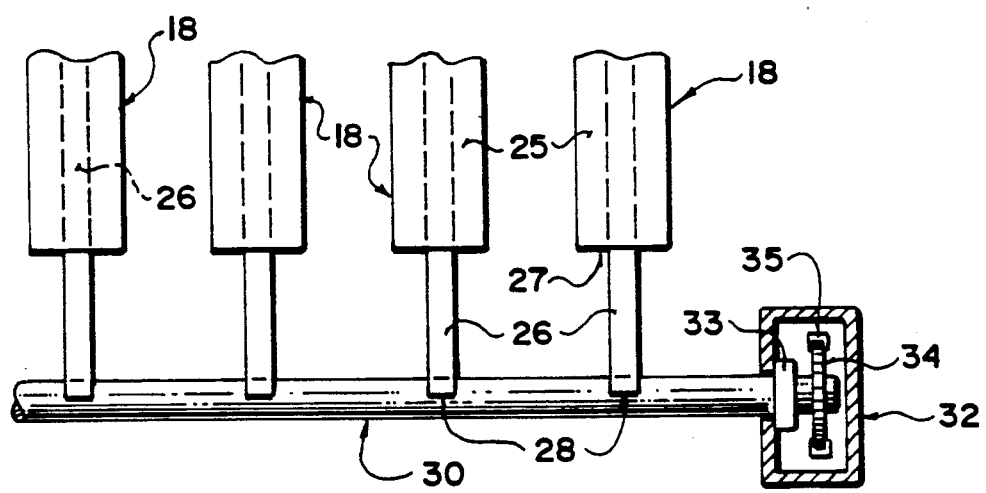
FIG. 3 is a top plan view of the forward end of the grate bars of FIG. 1 showing the cooperation with the grate bars and the transverse rod on an enlarged scale with the creeper bar omitted for convenience of illustration.
Figure 4:
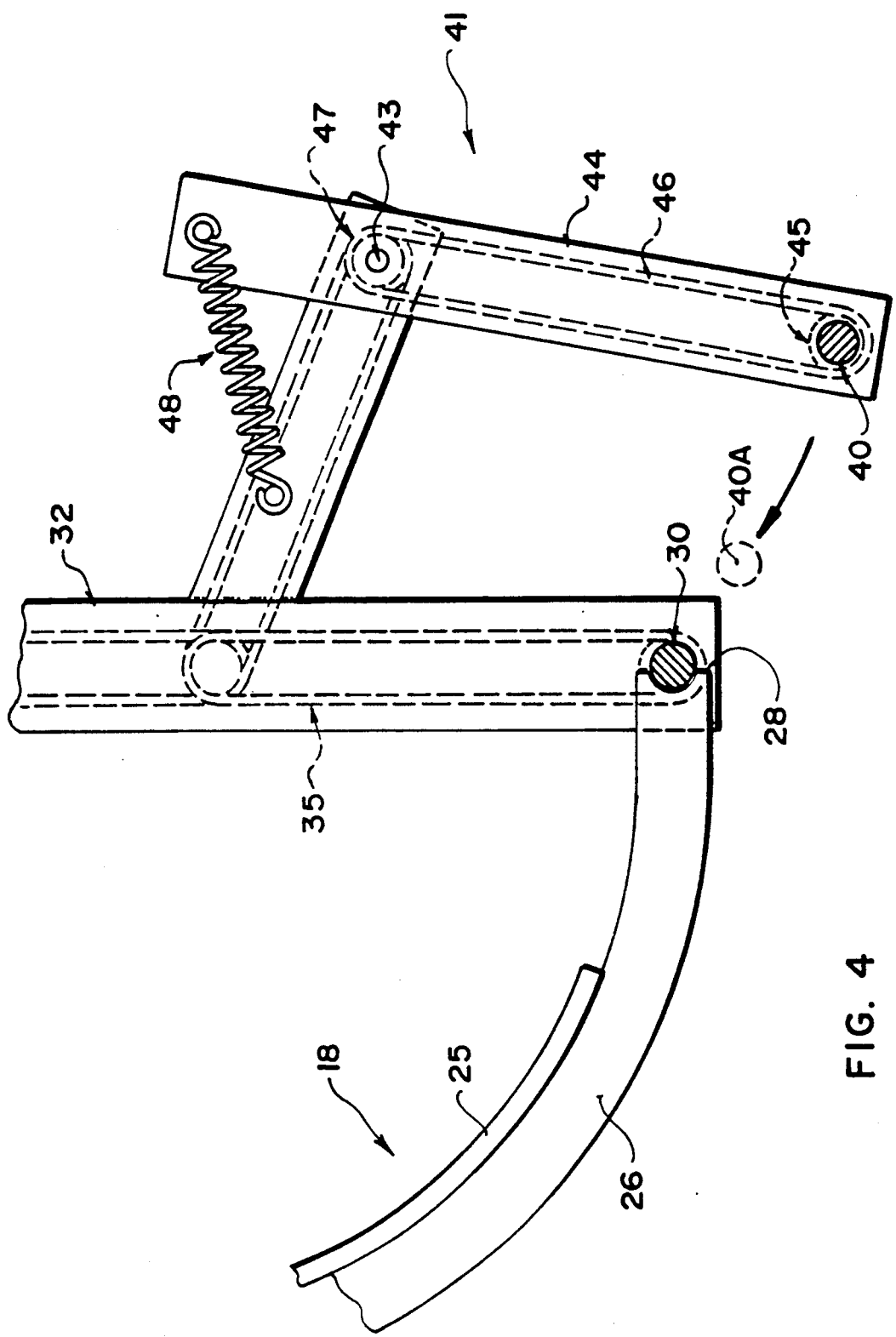
FIG. 4 is a view similar to that of FIG. 2 showing a further embodiment of the rock picker according to the invention.

Turning now to FIG. 4, there is shown a modified arrangement which includes all of the elements of the embodiments of FIGS. 2 and 3 together with a further rod 40 which is supported forwardly and downwardly of the rod 30. This rod 40 is spaced forwardly of the ends 28 of the grate bars so that it is unsupported thereby. The rod 40 is thus supported solely by a pair of leg structures generally indicated at 41 one of which is visible in FIG. 4 attached to the leg 32. It will be appreciated that a second leg structure 41 is connected to the leg 31 and leads back to the other construction shown in FIG. 4. Thus the leg structure 41 includes a forwardly extending beam 42 connected to a forward face of the leg 32 and rigidly attached thereto. At a forward end of the beam 42 is provided a pivot pin 43 which carries a pivotal leg 44 extending generally downwardly therefrom. The leg 44 includes a bearing (not shown) for the rod 40 together with a sprocket 45 for driving the rod 40 in the same direction as the rod 30. The sprocket 45 is driven by a chain 46 from the chain 35 including a guide sprocket 47 at the knee joined defined by the pivot pin 43. The leg 44 can pivot about the pin 43 from an initial working position shown in FIG. 4 to a retracted or trip position in which the rod moves to the position indicated at 40A which is immediately adjacent the rod 30. This trip action is resisted by a spring 48 which pulls the leg 44 into the working position. The spring is shown only schematic but is arranged so that its spring force reduces as the leg and the rod move into the trip position 40A.

The rod 40 is thus supported only at its ends by the legs 44. On engaging a particularly heavy rock it is tripped rearwardly to a position adjacent the rod 30 whereupon the heavy rock will also engage the rod 30 with that rod acting in conjunction with the grate bars to resist the impact of the heavy rock and to cause that rock to lift over the rod 30 and the rod 40A onto the grate bars.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An agricultural rock picker comprising a frame, ground wheels on the frame for moving the frame across the ground in a direction of working moving, a picker grate mounted on the frame for movement across the ground for lifting rocks from the ground onto the grate for collection, the picker grate comprising a plurality of grate bars arranged in parallel relationship parallel to the direction of movement and spaced apart transversely to the direction of movement, each grate bar having a forward end and extending rearwardly and upwardly therefrom for transporting rocks lifted over the forward end rearwardly for collection, a rod mounted transversely to the grate bars at the forward ends thereof so as to engage the ground and any rocks therein immediately forwardly of the forward ends of the grate bars, means for drivingly rotating the rod in a direction such that a forward part of the surface of the rod moves upwardly and support means for supporting the rod at ends thereof and at a plurality of spaced positions across the width of the picker grate.

2. The rock picker according to claim 1 wherein each grate bar includes a portion thereof at the forward end thereof which comprises a vertical plate which in cross section has a height greater than a width thereof.

3. The rock picker according to claim 2 including a receptacle formed in an end of each plate for receiving the periphery of the rod for rotation relative thereto while supporting the rod against rearward movement.

4. The rock picker according to claim 2 wherein each grate bar includes a cross plate at a position spaced rearwardly from the forward end such that the crossplate and the vertical plate are T-shaped in cross-section.

5. The rock picker according to claim 4 including a rock sweeper assembly mounted for rotation relative to the grate about an axis above the grate, the rock sweeper assembly including a plurality of transverse sweeper bars mounted thereon for rotation therewith about the axis, the sweeper bars passing over the grate above the grate bars and each including a plurality of downwardly extending sweeper teeth each extending from a respective one of the sweeper bars outwardly between a respective pair of the grate bars, the rotation of the rock sweeper assembly being arranged such that the sweeper teeth move from a position forwardly of the rod rearwardly and downwardly so as to pass between the grate bars at a position rearwardly of the rod.

6. The rock picker according to claim 1 including a second rod and means mounting the second rod substantially parallel to the first rod and forwardly and downwardly therefrom so as to engage the ground forwardly of and downwardly of the first rod and means for rotating the second rod in the same direction as the first rod.

7. The rock picker according to claim 6 wherein the second rod is supported only at the ends thereof and wherein there is provided spring trip means allowing movement of the second rod rearwardly and upwardly to a position adjacent the first rod.

8. An agricultural rock picker comprising a frame, ground wheels on the frame for moving the frame across the ground in a direction of working moving, a picker grate mounted on the frame for movement across the ground for lifting rocks from the ground onto the grate for collection, the picker grate comprising a plurality of grate bars arranged in parallel relationship parallel to the direction of movement and spaced apart transversely to the direction of movement, each grate bar having a forward end and extending rearwardly and upwardly therefrom for transporting rocks lifted over the forward end rearwardly for collection, a rod mounted transversely to the grate bars at the forward ends thereof so as to engage the ground and any rocks therein immediately forwardly of the forward ends of the grate bars and means for drivingly rotating the rod in a direction such that a forward part of the surface of the rod moves upwardly, the grate bars having support means at a forward end of the grate bars for supporting the rod against rearward movement.

9. The rock picker according to claim 8 wherein said support means comprises a portion of each grate bar at a forward end thereof which portion comprises a vertical plate which in cross section has a height greater than a width thereof.

10. The rock picker according to claim 8 wherein the support means comprises a receptacle formed in an end of each plate for receiving the periphery of the rod for rotation relative thereto while supporting the rod against rearward movement.

11. The rock picker according to claim 10 wherein each grate bar includes a cross plate at a position spaced rearwardly from the forward end such that the crossplate and the vertical plate are T-shaped in cross-section.

12. The rock picker according to claim 11 including a rock sweeper assembly mounted for rotation relative to the grate about an axis above the grate, the rock sweeper assembly including a plurality of transverse sweeper bars mounted thereon for rotation therewith about the axis, the sweeper bars passing over the grate above the grate bars and each including a plurality of downwardly extending sweeper teeth each extending from a respective one of the sweeper bars outwardly between a respective pair of the grate bars, the rotation of the rock sweeper assembly being arranged such that the sweeper teeth move from a position forwardly of the rod rearwardly and downwardly so as to pass between the grate bars at a position rearwardly of the rod and forwardly of the end of the cross plate.

13. The rock picker according to claim 8 including a second rod and means mounting the second rod substantially parallel to the first rod and forwardly and downwardly therefrom so as to engage the ground forwardly of and downwardly of the first rod and means for rotating the second rod in the same direction as the first rod.

14. The rock picker according to claim 13 wherein the second rod is supported only at the ends thereof and wherein there is provided spring trip means allowing movement of the second rod rearwardly and upwardly to a position adjacent the first rod.

15. An agricultural rock picker comprising a frame, ground wheels on the frame for moving the frame across the ground in a direction of working moving, a picker grate mounted on the frame for movement across the ground for lifting rocks from the ground onto the grate for collection, the picker grate comprising a plurality of grate bars arranged in parallel relationship parallel to the direction of movement and spaced apart transversely to the direction of movement, each grate bar having a forward end and extending rearwardly and upwardly therefrom for transporting rocks lifted over the forward end rearwardly for collection, a rod mounted transversely to the grate bars at the forward ends thereof so as to engage the ground and any rocks therein immediately forwardly of the forward ends of the grate bars and means for drivingly rotating the rod in a direction such that a forward part of the surface of the rod moves upwardly, each grate bar including a portion thereof at the forward end thereof which comprises a vertical plate which in cross section has a height greater than a width thereof, each plate having a receptacle formed in an end thereof receiving the periphery of the rod for rotation relative thereto while supporting the rod against rearward movement.

16. The rock picker according to claim 15 wherein each grate bar includes a cross plate at a position spaced rearwardly from the forward end such that the crossplate and the vertical plate are T-shaped in cross-section.

* * * * *